(12) United States Patent
Sheerin (10) Patent No.: US 9,275,488 B2
(45) Date of Patent: Mar. 1, 2016

(54) SYSTEM AND METHOD FOR ANIMATING A BODY

(71) Applicant: Daniel Paul Sheerin, Westchester, CA (US)

(72) Inventor: Daniel Paul Sheerin, Westchester, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 403 days.

(21) Appl. No.: 13/649,855

(22) Filed: Oct. 11, 2012

(65) Prior Publication Data

US 2014/0104282 A1 Apr. 17, 2014

(51) Int. Cl.
*G06T 13/40* (2011.01)

(52) U.S. Cl.
CPC ...................................... *G06T 13/40* (2013.01)

(58) Field of Classification Search
CPC ............ A63F 2300/6607; G06T 13/40; G06T 2207/30196; G06T 2207/10016; G06T 2213/12; G06T 7/0071; G06T 7/2046; G06T 13/00; G06T 13/20; G06T 19/00; G06T 2210/21; G06T 17/00; G06T 2213/08; G06T 2219/2021; G06N 3/008; Y10S 345/952
See application file for complete search history.

(56) References Cited

U.S. PATENT DOCUMENTS

| 7,931,604 | B2 | 4/2011 | Even Zohar et al. |
| 2007/0016265 | A1 | 1/2007 | Davoodi et al. |
| 2007/0172797 | A1* | 7/2007 | Hada et al. ........................ 434/1 |
| 2008/0004811 | A1* | 1/2008 | Suzuki et al. ................... 702/19 |
| 2010/0123723 | A1* | 5/2010 | Collard et al. ................ 345/473 |

OTHER PUBLICATIONS

Maya Muscle, Autodesk Maya, 2010, retrieved from http://download.autodesk.com/us/support/files/muscle.pdf on Oct. 5, 2014.*
Kass et al., Animating Oscillatory Motion With Overlap: Wiggly Splines, Pixar Technical Memo 06-06a, Jun. 2008.*
How We Do Biomechanics Research with Detailed Models. http://www.stanford.edu/~ctj/biomchrs.html. pp. 1-3. May 18, 2008.

* cited by examiner

*Primary Examiner* — Haixia Du
(74) *Attorney, Agent, or Firm* — Mark D. Wiecorek; Mayer & Williams PC (57) ABSTRACT

Systems and methods are disclosed for applying a controllable and predictable muscle oscillation to a portion of a body such as a character in a predetermined and intuitive way. Positions of separate muscle locations are analyzed throughout a timeline. A third derivative with respect to time of the positions of the separate muscles is calculated to measure a change of acceleration for a particular point of interest. The change in the acceleration gives positive or negative changes in the applied forces. The direction and magnitude of the applied forces is passed onto a part of a solution that creates a procedural oscillation based on the magnitude and the direction of the applied forces in the muscle space.

17 Claims, 5 Drawing Sheets

SYSTEM AND METHOD FOR ANIMATING A BODY

BACKGROUND

Character animation has become increasingly sophisticated. For example, besides just animating the movements of characters, character bodies animate within themselves, e.g., deforming in response to character movements and collisions. For example, deformation parameters may provide for bulging of skin surfaces when a character flexes a joint.

More sophisticated techniques for skin deformation include the simulation of muscles. The muscles may be defined by a geometry with control points, and collision detection may be employed to move or to deform the muscle geometry as muscles interact with bones or other muscles.

However, such techniques have not to date resulted in satisfactory visual effects in all circumstances. For example, complicated dynamic simulations, e.g., those employing continuum mechanics, where elements in a subsequent frame are calculated by consideration of forces on objects in a prior frame, are computationally intensive and highly inconvenient.

SUMMARY

The system and method provide a tool that allows a controllable and predictable muscle oscillation or "jiggle" to be applied throughout a body, such as a character, in a predetermined and intuitive way. In this way, the system avoids having to keyframe the motion by hand or run complex dynamic simulations.

One aspect according to present principles is that the calculation is simplified. The worldspace positions of separate muscle locations are rapidly analyzed throughout a timeline. A third derivative of position with respect to time is then taken, which is equivalent to measuring sudden changes of acceleration for particular points of interest. For example, to get constant acceleration, constant force is required. By measuring a change of acceleration, it is possible to detect positive or negative changes in the applied forces. Such is known in physics as a "jerk" or "jolt", which are vectors. By measuring the direction and magnitude of these vectors, and comparing to a predetermined threshold, it can be determined whether the underlying force was strong enough to promote a muscle oscillation and also a resulting general direction for muscle movement. Limits may also be set as to the maximum jolt size that can be affected, and/or the maximum amount of muscle movement. Such is important for keeping the resulting muscle oscillation sensitive enough for subtle animation while also working in situations resulting in very fast and sudden changes in direction or velocity. Any jolts beyond the predetermined threshold are passed on to a part of the solution that creates a procedural oscillation based on the magnitude and direction of the vector in the space of the muscle. This oscillation is applied as simple animation keys to the muscle and is defined by wavelength and magnitude, with the effect of a damping coefficient also considered.

In one aspect, the invention is directed towards a method of animating an external layer of a body, including: for a point location on an external layer of a body, taking a third derivative of position with respect to time to determine a vector whose magnitude is a rate of change of acceleration of the point location; and if the vector magnitude is greater than a predetermined threshold, then applying an oscillation to the external layer.

Implementations of the method may include one or more of the following. The body may be a character, and the external layer may represent a muscle group or a body mass group, e.g., flesh, fat, or muscles. The body mass group may be defined between a plurality of joints, and the body mass group may be constrained against oscillation at a point of connection with each of the joints, and the body mass group may experience a minimum of the magnitude of oscillation at the connection points and an upper limit of the magnitude of oscillation between the connection points. The body mass group may be associated with a set of parameters including a maximum longitudinal value, a maximum rotational value, and a damping coefficient, and the parameters may include a common factor, where by changing the common factor, each of the parameters scales to an appropriate value. After a temporal delay following the applying an oscillation, another oscillation may be applied to another body mass group. The temporal delay may be associated with a time required to display 1 to 5 frames. A magnitude of the another oscillation may be a fraction of a magnitude of the oscillation. A magnitude of oscillation may be proportional to the vector magnitude. The oscillation may have an associated wavelength, magnitude, and damping coefficient. The vector magnitude may have an upper limit, and an oscillation magnitude may be substantially the same as the vector magnitude. The external layer may correspond to a body mass group on a bone between two joints having a longitudinal axis, and the method may further include representing the vector by a longitudinal component and a rotational component, and may further include: applying the longitudinal component to an oscillation of the body mass group along a longitudinal axis of the bone; and applying the rotational component to a rotational oscillation of the body mass group about the longitudinal axis of the bone. The method may further include comparing a magnitude of the longitudinal component to a maximum longitudinal value, and if the magnitude is greater than the maximum longitudinal value, then using the maximum longitudinal value in the applying the longitudinal component to an oscillation of the body mass along the length of the bone. The method may further include comparing a magnitude of the rotational component to a maximum rotational value, and if the magnitude is greater than the maximum rotational value, then using the maximum rotational value in the applying the rotational component to a rotational oscillation of the body mass about the longitudinal axis of the bone. The body mass group on a bone may define a translation unit vector along a length of the bone, and may further define a rotation unit vector perpendicular to the translation unit vector, and the longitudinal component of the oscillation may be proportional to a dot product of the jolt vector and the translation unit vector, and the rotational component of the oscillation may be proportional to a dot product of the jolt vector and the rotation unit vector.

In another aspect, the invention is directed towards a non-transitory computer-readable medium, including instructions for causing a computing environment to implement the above method.

In another aspect, the invention is directed towards a system implemented in a non-transitory computer-readable medium for animating an external layer of a body, including: a jolt determination module, the jolt determination module for accepting one or more animation curves representing positions on or within a body and determining if an oscillation should be applied to a body mass group within the body, and if an oscillation should be applied, determining the magnitude and direction of the oscillation; and an oscillation application module, for applying the oscillation to the body mass group, the oscillation application module representing the oscillation by a longitudinal component and a rotational component.

Implementations of the invention may include that the jolt determination module takes a third derivative of the position with respect to time, where the body mass group is defined on a bone between two joints having a longitudinal axis, and where the longitudinal component is applied to the body mass group along the longitudinal axis and where the rotational component is applied to the body mass group about the longitudinal axis.

Advantages of the invention may include one or more of the following. By employing a simplified calculation, the simulation may be performed in a rapid manner. For example, in experiments the described system may take 30 seconds for a calculation that previously took several hours. Highly-realistic muscle movements may be simulated in a convenient fashion, and may be applied throughout a character's motion in a predetermined and intuitive way. The system and method avoid having to keyframe muscle movements by hand or run complex dynamic simulations. The system and method take account of the particular force involved, rather than just blending an oscillation in and out. The system and method may be particularly appropriate where a large number of forces are to be calculated by the animation, e.g., in a crowd situation, as the particularly important jolt forces may be quickly identified and employed. Other advantages will be apparent to one of ordinary skill in the art from the description that follows, including the figures and claims.

BRIEF DESCRIPTION OF THE DRAWINGS

Like reference numerals refer to like elements throughout.

DETAILED DESCRIPTION

Figure 1:
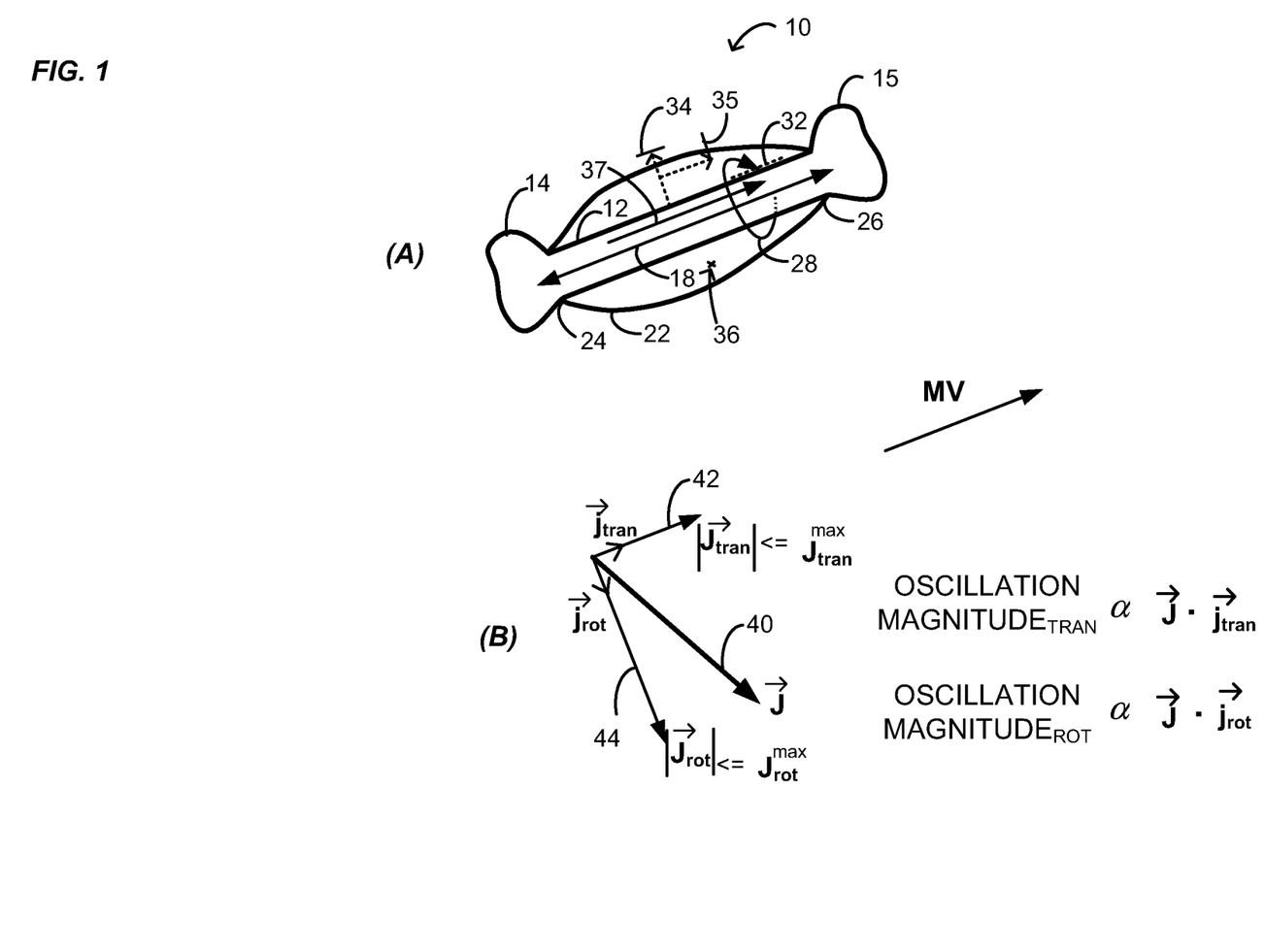
FIGS. 1(A) and 1(B) illustrate an exemplary bone and joint system having a body mass group such as a muscle group associated thereon, as well as a vector diagram illustrating jolt forces on the body mass group.

Referring to FIG. 1(A), a system 10 is illustrated including a body mass group 22 surrounding a bone 12 defined between two joints 14 and 15. The body mass group 22 generally represents an external layer of a character, a layer which can move separately from the bones. The body mass group 22 is illustrated as a simple example; it will be understood that other body mass groups may be similarly modeled. For example, pectoral muscles may be modeled as a body mass group or muscle group but may be modeled as having more than two joints where such muscles attach to bones. Where the body mass group or muscle group attaches to bones, shown in FIG. 1 as points 24 and 26, a minimum of motion of the body mass group 22 may occur. Put another way, the boundary conditions of the oscillation of the body mass group 22 may be such that minimum or zero movement occurs at the points 24 and 26.

The animation of the system 10 includes analyzing its motion in worldspace, i.e., its motion relative to a fixed reference frame rather than relative to, e.g., another character or a vehicle. As the character and body mass group are considered as moving relative to the fixed reference system of the scene, the forces, accelerations, and jolts are indicative of what an actual character would be experiencing. Moreover, as discussed in greater detail below, it is more convenient to limit or clamp inputs to the system using a worldspace reference frame.

It is noted that in an alternative calculation, the movement of the characters may be neutralized, i.e., set at zero, and the scene may move around the character. However, in this case, a different set of default oscillation parameters may have to be employed for every scene, and such may be an inconvenient complexity. Rather, in one implementation employed according to the principles described here, a single set of parameters (per body mass group) may be employed for most scenes. Such parameters may include damping coefficients, a maximum longitudinal value, a maximum rotational value, or the like, as well as higher order terms which may be employed if computationally convenient. Such parameters may still be altered, and it may be desired to change one without having to change the others. In some cases, the parameters may all have a common factor, and by changing the common factor, the parameters for a particular body mass group may all be changed, e.g., for high-speed collisions versus low-speed collisions. By providing a limit or clamp on the input vector, the system may inherently prohibit perpetual motion, unbounded oscillations, and the like. Of course, limits or clamps may also be put on the output of the oscillation, e.g., on the magnitude of the oscillation. Moreover, other aspects which are external to the oscillation system may also provide the noted prohibitions, e.g., fading out of motions at the end of scenes.

Jolt calculations are particularly convenient as the same indicate generally sparse key moments for acceleration, rather than constantly simulating substantially constant accelerations. In this way, only key moments are captured and used in calculations, i.e., those that are particularly important, and thus computation time is conserved.

Such jolts calculate the forces that must have been applied at that moment to the body mass group and use the forces to calculate how the body mass group would oscillate. To inhibit calculations of lesser importance, a lower limit or threshold may be placed on jolt calculations, so that the magnitude of the vector (of the third derivative of position with respect to time) may be required to be greater than a certain predetermined threshold to result in or cause a body mass group oscillation. Below the predetermined threshold, the body mass group is not caused to oscillate as the same is considered to be too minor to result in significant movements. In some cases, lower thresholds may be employed if the body mass group is less constrained to the character skeleton, or if the jolt vector is in a direction particularly inclined to lead to a significant muscle oscillation.

As noted above, an upper limit or clamp may also be placed on the input vector, to take account of the physical realities of body mass group movements. A damping threshold may also be employed, where the effects of damping have caused the oscillation magnitude to be reduced below a damping threshold. At this point, the system may no longer cause the body mass group to oscillate. Of course, in systems where computation time is not a significant cost factor, the body mass group may simply be allowed to continue to oscillate until the damping causes the extinguishing of the oscillation.

Referring back to FIG. 1 (A), certain of these aspects are illustrated. For any given movement within the animation, movements of a point 36 on the body mass group 22 may be calculated, and the results of the calculation applied to the entire body mass group 22. The point 36 may represent the most deformed point on the skin or body mass group, but this point may already be influenced by other movements or deformations so it is instead necessary to define a new point (a transform or pseudo-joint) as part of the basic skeleton that can be analyzed for world space motion. In this way the calculation is simplified further and is independent from other potential calculations. Thus the calculation may be performed very rapidly as only one point need be calculated per body mass group. Of course, for particularly large body mass groups, more points may be employed, e.g., one for a front side and one for a back side. Points 24 and 26 are points that have zero influence from the resulting oscillation while point 36 is a point that would have full effect from the oscillation. Thus FIG. 1(A) may be a typical example of how the oscillation is applied to the final skin of a character. Point 36 can also be used as a guide to where to place the "point of interest" as it may have significant correlation with the desired effect.

The body mass group 22 may constitute or represent flesh, muscles, fat, skin, or the like. In many cases, it is convenient to think of the body mass group 22 as constituting a muscle group cluster, and the skin is considered to follow the motions of the muscle group, i.e., be bound to the same. In other implementations, the skin may be animated, it may be considered as its own body mass group, e.g., attached to the muscle group at a number of points, it may be treated in another way, or the like. In other words, the skinning method is generally arbitrary.

In some cases the system may even apply to clothing. Generally, clothing may simply be bound to the skin. However, a free flowing dress may be modeled such that the bottom is free to rotate under the effect of jolt forces, but may be subject to much lesser forces than in a muscle group. In many cases, however, clothing may simply be subject to a separate cloth simulation.

In FIG. 1(A), the system 10 may for instance represent a bicep, having a body mass group 22 defined between joints such as a shoulder and an elbow. In the center of the body mass group 22, the bicep may potentially experience a maximum of motion as the same may be the most free-moving part of the muscle group. Movement may diminish or fade out at the joints. In general, within a given muscle group, it may be delineated that a particular point is 0% influenced by the jolt, 50% influenced, and so on. The body mass group may experience translational or longitudinal oscillations along a longitudinal axis 18, and may experience rotational oscillations about the same axis.

In FIG. 1(B), it is assumed that analysis of the animation motion, i.e., one or more animation curves, has determined that a jolt vector J (element 40) experienced by the point 36 on the body mass group 22 has been determined to have a magnitude greater than the predetermined threshold. Consequently, the input vector 40 is applied to the body mass group 22 to cause an oscillation. To apply the vector, the body mass group may have associated therewith a unit vector $j_{tran}$ in the direction of initial positive translational or longitudinal motion and a unit vector $j_{rot}$ in the direction of initial positive rotation. A magnitude of rotation $J_{rot}$ may then be defined by the dot product between the unit vector of rotation $j_{rot}$ and J, and a magnitude of translational oscillation may be defined by a similar dot product with $j_{tran}$. For rotations, the model is thus reduced to an unbalanced mass at a location away from a central axis of rotation. If the force is applied laterally to this offset mass, it will trigger a rotation.

In more detail, the vector may thus be decomposed into a translational component $J_{tran}$ and a rotational component $J_{rot}$. $J_{tran}$ may be applied along the axis 18 to result in longitudinal oscillations of the body mass group 22 and $J_{rot}$ may be applied about the axis 18 to result in rotational oscillations of the body mass group 22. In general, for body mass groups such as biceps, there may be a preponderance of rotational oscillations over translational oscillations, as muscle fibers generally extend along the length of a bone and the body mass group is generally secured at the joints, resulting in more rotational freedom than translational or longitudinal. However, one of ordinary skill in the art will recognize that body mass groups may vary in this regard. For example, if the force is substantially collinear with a longitudinal axis 18, only a slight rotational oscillation (or no rotational oscillation) may ensue.

As indicated in FIG. 1(B), $J_{tran}$ may be clamped at $J_{tran}^{max}$ and $J_{rot}$ may be clamped at $J_{rot}^{max}$. Such maximum values may be used in combination with maximum values for the oscillation magnitudes, both longitudinal and rotational, or may substitute therefore. Maximum values for oscillation magnitudes are illustrated in FIG. 1(A) by elements 32 (rotational) and 35 (longitudinal). In addition, a radial oscillation magnitude maximum value 34 is illustrated, for jolts that result in radial oscillations.

In one implementation, a muscle alignment vector MV 37 may be defined. The unit vectors $j_{rot}$ and $j_{tran}$ may then be defined relative to MV.

As noted, the effects of a jolt vector J may be clamped such that only a maximum value is allowed to be input into the oscillation calculation. For example, an animator may desire that the maximum amount of rotation of a muscle group should be 45°. The input clamp may then be set so that no matter what $J_{rot}$ is, the maximum rotational oscillation amplitude, i.e., the amplitude of the initial rotational oscillation, will not exceed 45°.

Such clamping may be done any number of ways. For example, for the largest $J_{rot}$ determined by the appropriate animation curves, the amplitude of the rotational oscillation may be set at 45°, and for any $J_{rot}$ less than the maximum, the oscillation magnitude may simply vary linearly (or otherwise smoothly) in a monotonic fashion. In another implementation, $J_{rot}^{max}$ may be set less than the largest $J_{rot}$ determined by the appropriate animation curves, and for any $J_{rot}$ greater than $J_{rot}^{max}$, $J_{rot}^{max}$ may be used. For lesser values, a linear or other relationship may be used to determine $J_{rot}$.

For longitudinal or translational oscillations, other maximum values may be employed, e.g., a maximum displacement of 25% of the bone length. The other considerations discussed above in connection with how rotational oscillations are treated at maximum values may apply similarly.

Generally, it is desired to clamp what would be outside the ranges of the output, as opposed to what would be outside the ranges of the input and such is why the input range extreme may be determined by consideration of input values causing maximum amplitudes at the output. Otherwise, it is possible to lack visualization of motion that might actually be occurring, physical, and appropriate.

As an exemplary situation, a superhero character may strike a wall in an animation, causing his or her velocity to drop from a high-value to zero in a short period of time. Such would be a significant deceleration, and may also result in a significant change in acceleration, i.e., a jolt. Such a spike would likely be beyond the input maximum of the oscillation system, so a maximum oscillation of affected body mass groups would ensue, either longitudinally or rotationally. If the maximum is at a value of, e.g., 50, and the damping coefficient was 0.5, then the first oscillation would have an amplitude of 50, the next oscillation (on the opposite side) would be at 25, the next 12.5, etc. Such a calculation would be repeated for all of the muscle groups in the system, and would be decomposed into a translational component and a rotational component.

Similar muscle groups could have similar parameters, although a slight randomization could be provided for more interesting movements. For example, each pectoral muscle group could oscillate slightly differently. As noted above, parameters for translate and rotate vector actions could employ a common factor, so that by adjustment of the common factor, both parameters may be conveniently adjusted.

Figure 2:
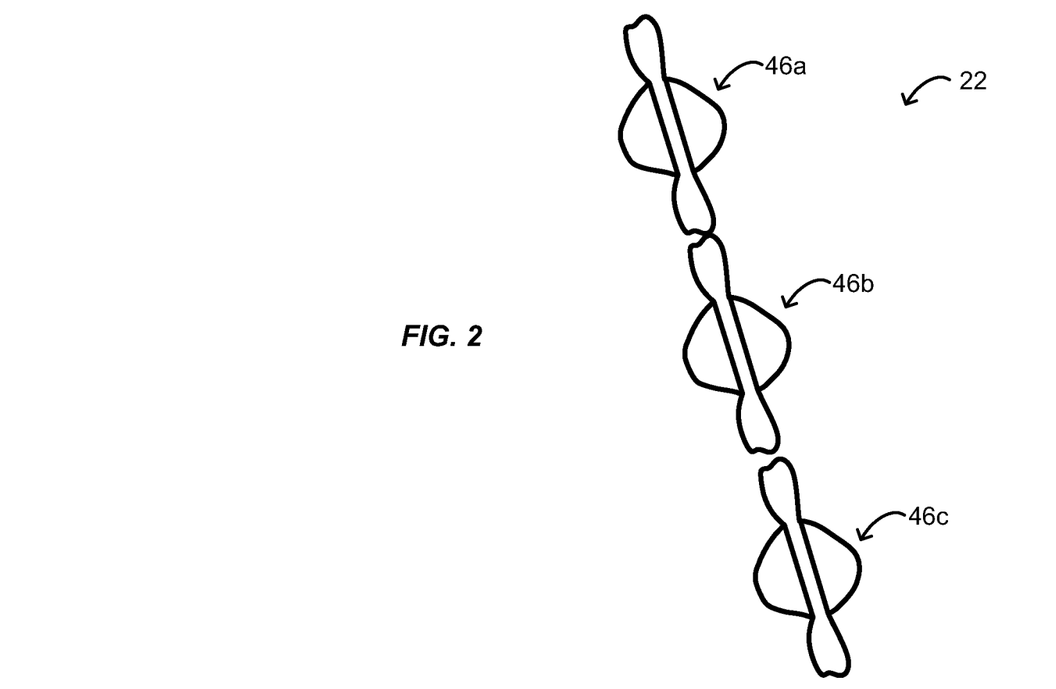
FIG. 2 illustrates a system of adjacent body mass groups in which a jolt may be propagated.

FIG. 2 illustrates another implementation of a system 22 which may be treated by the principles disclosed here, in which a number of body mass groups (with joints) 46a, 46b, and 46c are illustrated. The body mass groups 46a, 46b, and 46c are adjacent, and may have similar or related parameters, although related parameters are not required in any given implementation. Such a set of body mass groups may be appropriate for animation of, e.g., a long neck.

By analysis of the animation curves, a jolt may be determined to happen at 46a, but not at the others (although impact at the others may be treated similarly). A highly realistic visual effect may be provided by having the jolt essentially propagate down the set of bones, e.g., from 46a to 46b, and from 46b to 46c. The oscillation calculation may be performed for 46a, and then the results of the calculation may be simply applied with, e.g., a temporal delay, to the next body mass group. A "damping" may also occur in this system, such that the magnitude for each group is a fraction of that previously calculated for a prior group. For example, each could be 80% of the one preceding it. Each body mass group may have the same parameters or they may differ. Besides a linear propagation, circular or other propagation or ripple effects may also be understood to be within the scope of the disclosure.

The temporal delay may vary, and may be based on the characteristics of the body mass group. In a particularly simple ripple effect, the temporal delay may be between 1-5 frames.

Figure 3:
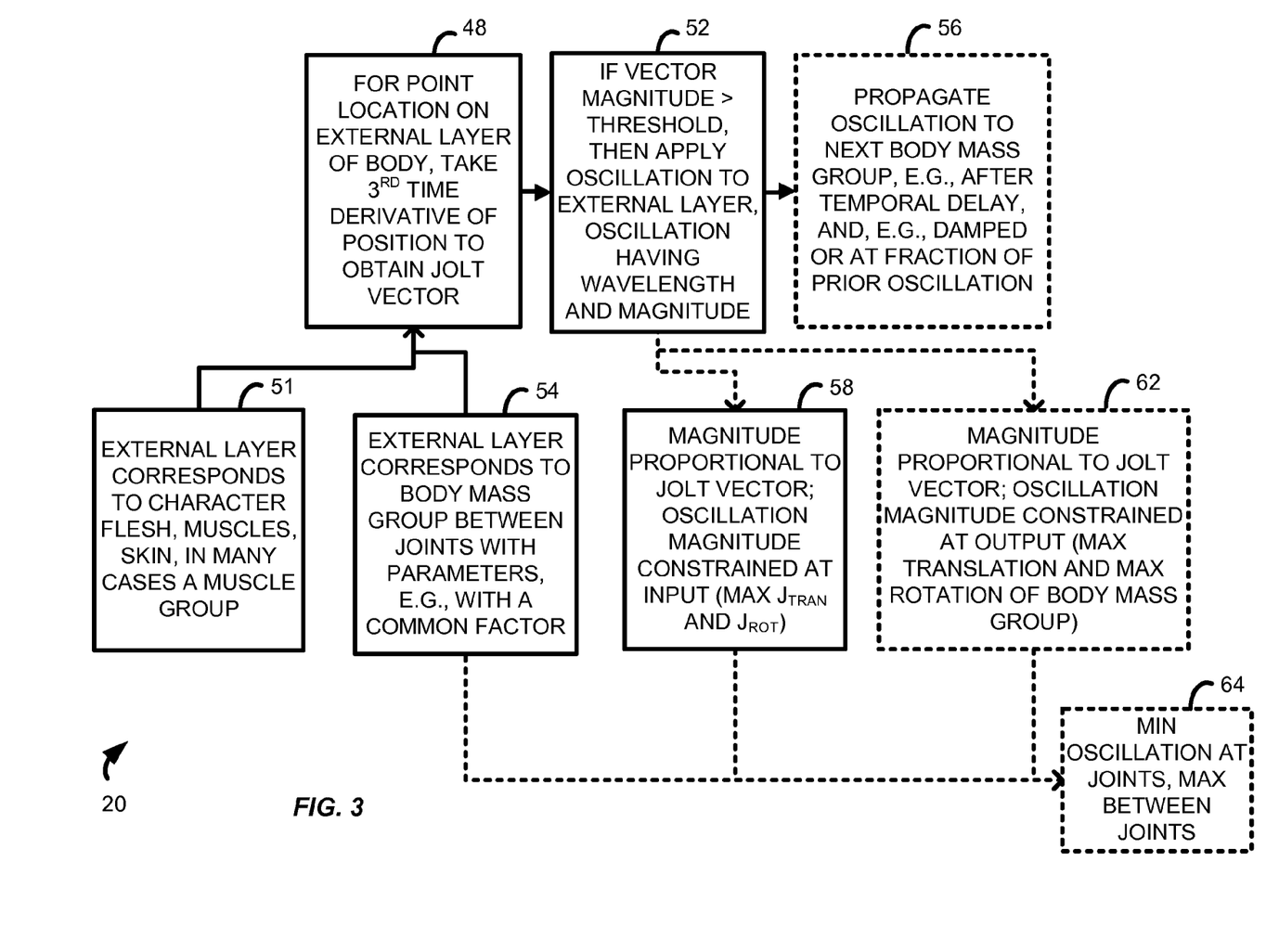
FIG. 3 is a flowchart illustrating an exemplary method according to the principles described here.

FIG. 3 is a flowchart 20 of an exemplary method according to the principles disclosed here. A first step is, for a point location on an external layer of a body, take the third time derivative of position with respect to time to obtain a jolt vector (step 48). The third time derivative may be calculated from the animation of the point location, i.e., analysis of the animation curves. The external layer is as noted above, and may generally indicate a body mass group such as a muscle group (step 51). Put another way, the external layer may correspond to a body mass group between a set of joints (step 54), the body mass group being defined at least in part by parameters. The parameters may have a common factor to allow convenient adjustment.

A next step is, if the vector magnitude is greater than a predetermined threshold, to apply an oscillation to the external layer (step 52). The oscillation generally has a wavelength and a magnitude. In one implementation, the magnitude of the oscillation is proportional to the magnitude of the vector, but the oscillation is constrained by having inputs on the size of the jolt vector (step 58). In another implementation, the magnitude of the oscillation is proportional to the magnitude of the vector, but the oscillation magnitude is constrained at the output (step 62). In this way, only a maximum translation and rotation of the body mass group is allowed. In other implementations, the oscillation is constrained in both ways. Generally, although not required, a minimum amount of oscillation, i.e., oscillation magnitude, may occur where the body mass group meets the joints, e.g., zero, with a maximum between the joints (step 64).

The oscillation is then damped, and the damping coefficient may be a function of the oscillation, the muscle group, or both. The damping coefficient may also be a constant.

The oscillation may then be propagated to another body mass group (step 56). The propagation may occur after a temporal delay, and maybe damped, such as by being a fraction of each prior oscillation magnitude.

Figure 4:
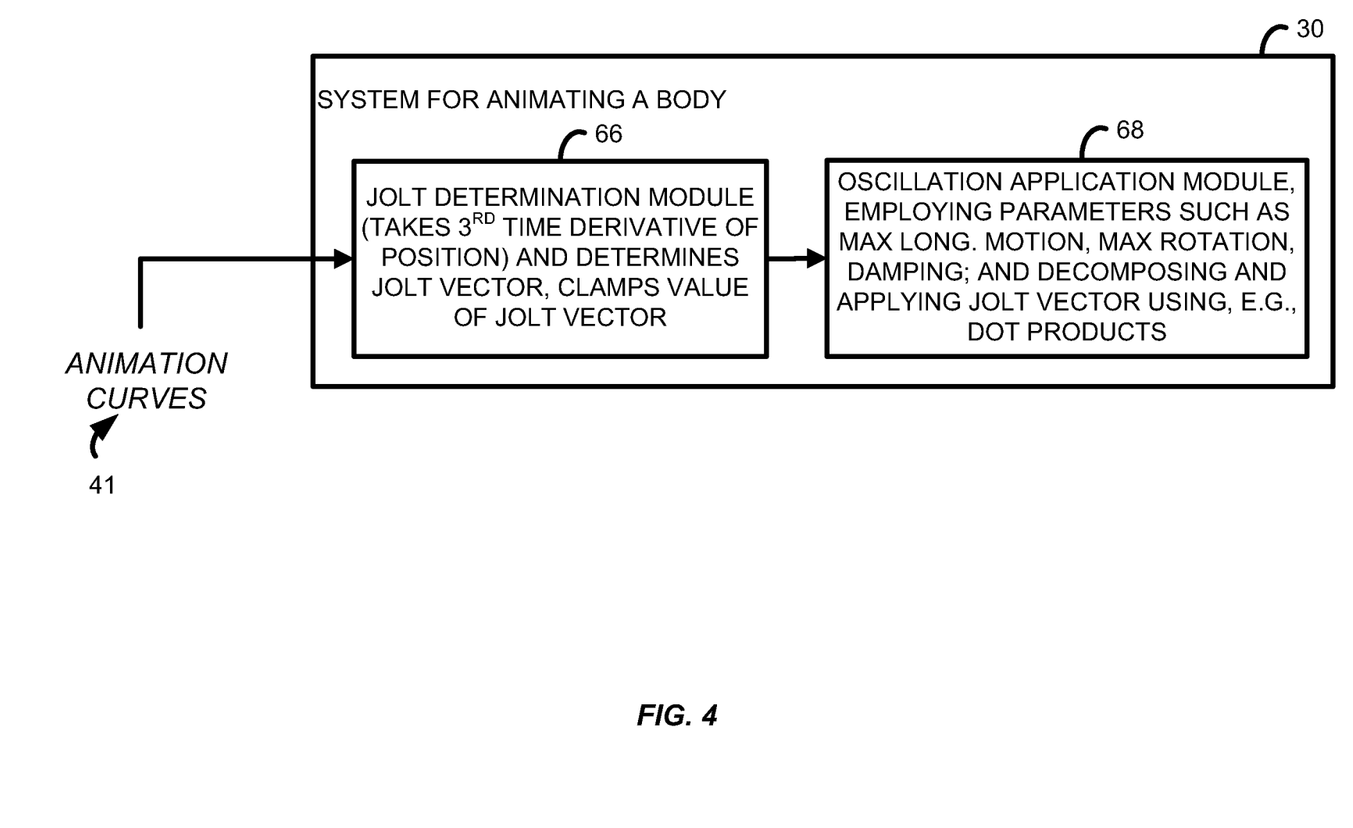
FIG. 4 illustrates a modular system in which a body may be animated, including consideration of jolt forces on body mass groups.

FIG. 4 illustrates a modular system 30 for animating a body. The system 30 accepts animation curves 41 as an input, or other such data as may indicate animated positions of a body. It will be understood that such data may be replaced by data indicating velocities or accelerations experienced by the body as a function of time.

The system 30 includes a jolt determination module 66, which calculates a third derivative of the position information with respect to time and from that determines the jolt vector. It will be understood that, if the velocity or acceleration data are input rather than position, the order of derivative will vary. If the jolt vector has a magnitude greater than a predetermined threshold, the jolt vector is input to an oscillation application module 68. The jolt vector magnitude may be clamped or limited as discussed above. The module 68 may employ parameters such as maximum longitudinal displacement, maximum rotational angle, damping coefficients, and the like to determine and apply the effects of the jolt to cause an oscillation of a given body mass group. Other parameters will also be understood to be employable for a given effect. In so doing, the oscillation application module may decompose the jolt vector and use dot and cross products, e.g., with a muscle alignment vector, to apply the jolt vector to a given body mass group.

It will be understood that the system 30 may organize the modules in any number of ways, with functions being distributed or shared between the various modules. Other modules may also be employed.

What has been described is a system that can rapidly and conveniently calculate highly-realistic oscillations of an external layer, e.g., body mass groups, of animated characters. The highly realistic depictions do not require complex dynamic simulations, and result in effective and accurate depictions of movement.

One implementation includes one or more programmable processors and corresponding computer system components to store and execute computer instructions, such as to provide the tools for receiving animation curves, calculating jolts, and applying the effects of jolts to animated bodies. One such computing environment is disclosed below.

Figure 5:
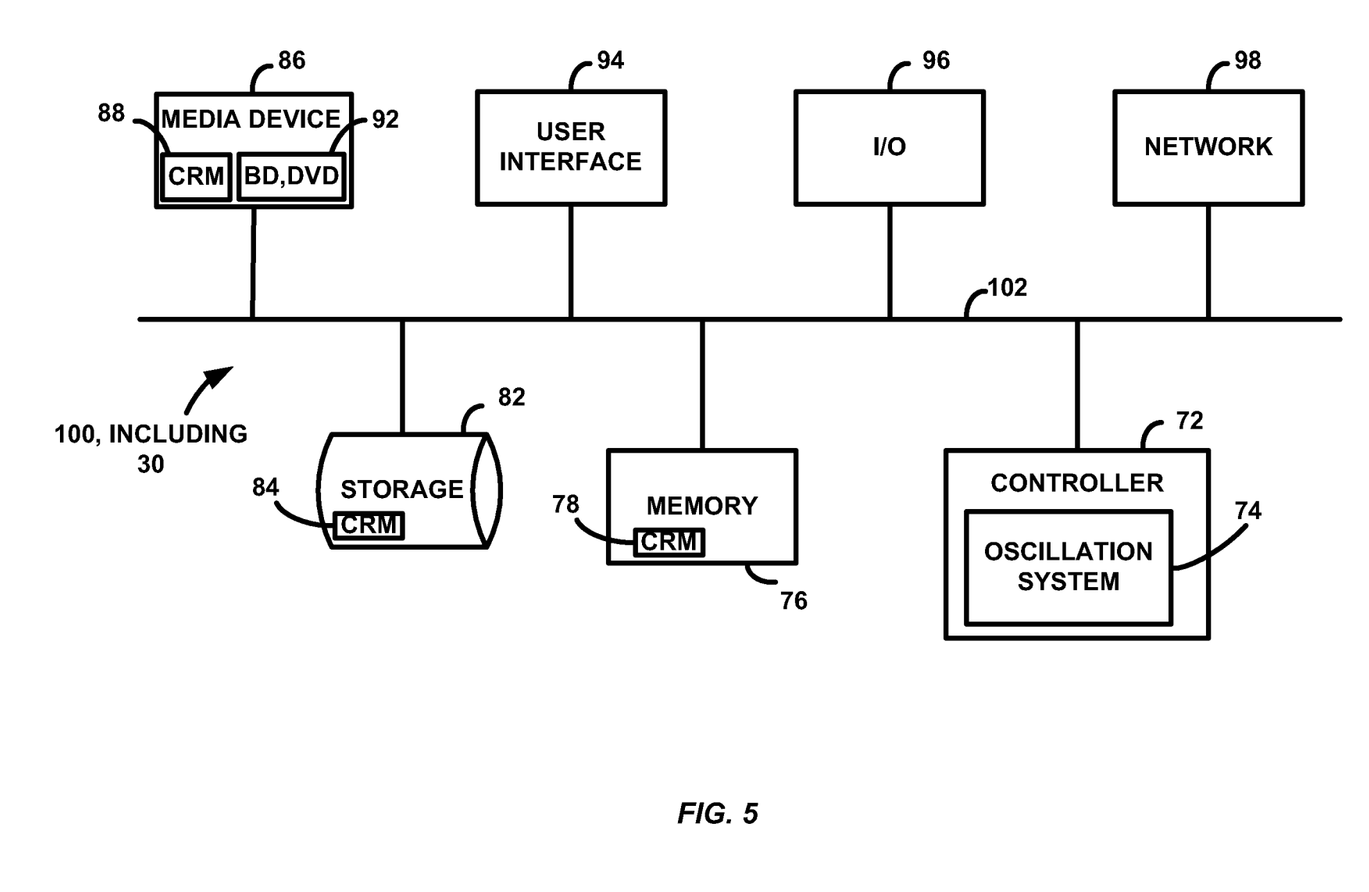
FIG. 5 illustrates an exemplary computing environment in which the system and method may be situated and performed.

Referring to FIG. 5, a representation of an exemplary computing environment 100 for an animation system is illustrated.

The computing environment 100 includes a controller 72, a memory 76, storage 82, a media device 86, a user interface 94, an input/output (I/O) interface 96, and a network interface 98. The components are interconnected by a common bus 102. Alternatively, different connection configurations can be used, such as a star pattern with the controller at the center.

The controller 72 includes a programmable processor and controls the operation of the system and its components. The controller 72 loads instructions from the memory 76 or an embedded controller memory (not shown) and executes these instructions to control an oscillation system 74.

A memory 76, which may include non-transitory computer-readable memory 78, stores data temporarily for use by the other components of the system. In one implementation, the memory 76 is implemented as DRAM. In other implementations, the memory 76 also includes long-term or permanent memory, such as flash memory and/or ROM.

Storage 82, which may include non-transitory computer-readable memory 84, stores data temporarily or long-term for use by other components of the system, such as for storing data used by the system or computing environment for calculating body mass group oscillations. In one implementation, the storage 82 is a hard disc drive or a solid state drive.

The media device 86, which may include non-transitory computer-readable memory 88, receives removable media and reads and/or writes data to the inserted media. In one implementation, the media device 86 is an optical disc drive or disc burner, e.g., a writable Blu-ray® disc drive 92.

The user interface 94 includes components for accepting user input, e.g., user indications of desired body mass groups to oscillate, and presenting results of oscillations to the user. In one implementation, the user interface 94 includes a keyboard, a mouse, audio speakers, and a display. The controller 72 uses input from the user to adjust the operation of the computing environment.

The I/O interface 96 includes one or more I/O ports to connect to corresponding I/O devices, such as external storage or supplemental devices, e.g., a printer or a PDA. In one implementation, the ports of the I/O interface 96 include ports such as: USB ports, PCMCIA ports, serial ports, and/or parallel ports. In another implementation, the I/O interface 96 includes a wireless interface for wireless communication with external devices. These I/O interfaces may be employed to connect to one or more content playback devices.

The network interface 98 allows connections with the local network and optionally with external networks as well. The network interface 98 includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such systems, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, to visualize the results of the oscillation system, a locator or other such transform could be moved around within a 3-D model system to visualize the results. Another transform may be applied to cause the translate and rotate vector actions. Such may be a highly modular way to implement and visualize the system and method, and could be implemented directly within many user interfaces. The user interface could allow an essentially one-touch operation to allow the animator to see the results of the applied muscle oscillations in an animation. The animator can adjust muscle parameters and re-run the animation to immediately see the results of the adjustment. Such a user interface may also allow the animator to alter keyframes to adjust a scene (and characters within) and thus adjust results according to the needs of the artistic direction.

It is also noted that for situations where multiple jolts exist at a point with magnitudes that exceed the predetermined threshold, the largest may prevail or all may be considered within a superposition. In a related situation, if an oscillation is occurring while another begins that is larger, the larger new oscillation can replace the older smaller one.

While the above implementations have focused on animated movies, it will be understood that the systems and methods according to principles disclosed here may also be employed in videogames or other audiovisual media in which virtual models are employed.

In addition, while the system has been described with respect to animated characters, layers on any flexible body may be subject to jolts, and the same may be effectively animated using systems and methods according to the principles described.

Finally, while it has been disclosed that the jolt vector magnitude is compared to a predetermined threshold to determine if an oscillation occurs, it will be clear to one of ordinary skill in the art given this disclosure that the same may apply to individual components of the jolt vector, where one or both components have to exceed the predetermined threshold to pass on an oscillation.

Accordingly, the invention is not to be limited by the description above, but only by the claims appended hereto, and equivalents thereof.

The invention claimed is:

1. A method of animating an external layer of a body, comprising:
   a. for a point location on an external layer of a body, taking a third derivative of position with respect to time to determine a vector whose magnitude is a rate of change of acceleration of the point location; and
   b. if the vector magnitude is greater than a predetermined threshold, then applying an oscillation to the external layer,
   c. wherein the body is a character and the external layer represents a body mass group, and wherein the body mass group is defined between a plurality of joints, and the body mass group is constrained against oscillation at a point of connection with each of the joints, and wherein the body mass group experiences a minimum of the magnitude of oscillation at the connection points and an upper limit of the magnitude of oscillation between the connection points,
   d. wherein the body mass group is associated with a set of parameters including a maximum longitudinal value, a maximum rotational value, and a damping coefficient, and wherein the parameters include a common factor, wherein by changing the common factor, each of the parameters scales to an appropriate value; and
   e. generating an animation with the applied oscillation.

2. The method of claim 1, wherein the body mass group represents flesh, fat, or muscles.

3. The method of claim 2, wherein the body mass group represents a muscle group.

4. The method of claim 1, wherein after a temporal delay following the applying an oscillation, applying another oscillation to another body mass group.

5. A method of animating an external layer of a body, comprising:
   for a point location on an external layer of a body, wherein the body is a character and the external layer represents a body mass group, taking a third derivative of position with respect to time to determine a vector whose magnitude is a rate of change of acceleration of the point location;
   if the vector magnitude is greater than a predetermined threshold, then applying an oscillation to the external layer; and
   generating an animation with the applied oscillation, wherein after a temporal delay following the applying an oscillation, applying another oscillation to another body mass group, wherein the temporal delay is associated with a time required to display 1 to 5 frames.

6. A method of animating an external layer of a body, comprising:

for a point location on an external layer of a body, wherein the body is a character and the external layer represents a body mass group, taking a third derivative of position with respect to time to determine a vector whose magnitude is a rate of change of acceleration of the point location;

if the vector magnitude is greater than a predetermined threshold, then applying an oscillation to the external layer; and generating an animation with the applied oscillation, wherein after a temporal delay following the applying an oscillation, applying another oscillation to another body mass group, wherein a magnitude of the another oscillation is a fraction of a magnitude of the oscillation.

7. A method of animating an external layer of a body, comprising:

for a point location on an external layer of a body, taking a third derivative of position with respect to time to determine a vector whose magnitude is a rate of change of acceleration of the point location; and if the vector magnitude is greater than a predetermined threshold, then applying an oscillation to the external layer and generating an animation with the applied oscillation;

wherein the oscillation has an associated wavelength, magnitude, and damping coefficient.

8. A method of animating an external layer of a body, comprising:

for a point location on an external layer of a body, taking a third derivative of position with respect to time to determine a vector whose magnitude is a rate of change of acceleration of the point location; and if the vector magnitude is greater than a predetermined threshold, then applying an oscillation to the external layer and generating an animation with the applied oscillation;

wherein the vector magnitude has an upper limit; and wherein an oscillation magnitude is substantially the same as the vector magnitude.

9. A method of animating an external layer of a body, comprising:

for a point location on an external layer of a body, taking a third derivative of position with respect to time to determine a vector whose magnitude is a rate of change of acceleration of the point location, wherein the external layer corresponds to a body mass group on a bone between two joints having a longitudinal axis, and further comprising representing the vector by a longitudinal component and a rotational component;

if the vector magnitude is greater than a predetermined threshold, then applying an oscillation to the external layer, wherein the applying as oscillation further comprises:

applying the longitudinal component to an oscillation of the body mass group along a longitudinal axis of the bone;

applying the rotational component to a rotational oscillation of the body mass group about the longitudinal axis of the bone; and generating an animation with the applied oscillation.

10. The method of claim 9, further comprising comparing a magnitude of the longitudinal component to a maximum longitudinal value, and if the magnitude is greater than the maximum longitudinal value, then using the maximum longitudinal value in the applying the longitudinal component to an oscillation of the body mass along the length of the bone.

11. The method of claim 9, further comprising comparing a magnitude of the rotational component to a maximum rotational value, and if the magnitude is greater than the maximum rotational value, then using the maximum rotational value in the applying the rotational component to a rotational oscillation of the body mass about the longitudinal axis of the bone.

12. The method of claim 9, wherein the body mass group on a bone defines a translation unit vector along a length of the bone, and further defines a rotation unit vector perpendicular to the translation unit vector, and wherein the longitudinal component of the oscillation is proportional to a dot product of the jolt vector and the translation unit vector, and wherein the rotational component of the oscillation is proportional to a dot product of the jolt vector and the rotation unit vector.

13. A non-transitory computer-readable medium, comprising instructions for causing a computing environment to implement the method of claim 1.

14. A system for animating an external layer of a body, comprising:

a. a jolt determination module, the jolt determination module for accepting one or more animation curves representing positions on or within a body and determining if an oscillation should be applied to a body mass group within the body, and if an oscillation should be applied, determining the magnitude and direction of the oscillation; and b. an oscillation application module, for applying the oscillation to the body mass group, the oscillation application module representing the oscillation by a longitudinal component and a rotational component to generate an animation;

c. wherein the jolt determination module is configured to determine if an oscillation should be applied by taking a third derivative of position with respect to time for a point location within the body mass group to determine a vector whose magnitude is a rate of change of acceleration of the point location, and if the vector magnitude is greater than a predetermined threshold, then the jolt determination is configured to determine that the oscillation should be applied;

d. wherein the body mass group is defined between a plurality of joints, and the body mass group is constrained against oscillation at a point of connection with each of the joints, and wherein the body mass group experiences a minimum of the magnitude of oscillation at the connection points and an upper limit of the magnitude of oscillation between the connection points, and e. wherein the body mass group is associated with a set of parameters including a maximum longitudinal value, a maximum rotational value, and a damping coefficient.

15. The system of claim 14, wherein the body mass group is defined on a bone between two joints having a longitudinal axis, and wherein the longitudinal component is applied to the body mass group along the longitudinal axis and wherein the rotational component is applied to the body mass group about the longitudinal axis.

16. The system of claim 14, wherein the parameters include a common factor, wherein by changing the common factor, each of the parameters scales to an appropriate value.

17. A method of animating an external layer of a body, comprising:

a. for a point location on an external layer of a body, taking a third derivative of position with respect to time to determine a vector whose magnitude is a rate of change of acceleration of the point location; and b. if the vector magnitude is greater than a predetermined threshold, then applying an oscillation to the external layer and generating an animation with the applied oscillation, wherein a magnitude of oscillation is proportional to the vector magnitude.

* * * * *